United States Patent [19]

Daikoku et al.

[11] Patent Number: 5,027,771
[45] Date of Patent: Jul. 2, 1991

[54] METHOD AND APPARATUS FOR CONTROLLING IGNITION TIMING FOR MARINE ENGINE

[75] Inventors: Keisuke Daikoku; Kazuhiro Umehara, both of Shizuoka, Japan

[73] Assignee: Suzuki Jidosha Kogyo Kabushiki Kaisha, Shizuoka, Japan

[21] Appl. No.: 477,611

[22] Filed: Feb. 9, 1990

[30] Foreign Application Priority Data

Feb. 15, 1989 [JP] Japan ................ 1-35510

[51] Int. Cl.$^5$ ................ F02P 5/14; F02P 5/145
[52] U.S. Cl. ................ 123/421; 123/424
[58] Field of Search ................ 123/418, 421, 424

[56] References Cited

U.S. PATENT DOCUMENTS

| | | | |
|---|---|---|---|
| 4,367,711 | 1/1983 | Ikeura | 123/421 |
| 4,442,813 | 4/1984 | Magase et al. | 123/424 |
| 4,570,596 | 2/1986 | Sato | 123/424 |
| 4,633,834 | 1/1987 | Takeuchi et al. | 123/418 |
| 4,702,211 | 10/1987 | Kato et al. | 123/421 |

FOREIGN PATENT DOCUMENTS

0213945 12/1984 Japan ................ 123/424
0169677 9/1985 Japan ................ 123/424

Primary Examiner—Tony M. Argenbright
Assistant Examiner—Robert E. Mates
Attorney, Agent, or Firm—Flynn, Thiel, Boutell & Tanis

[57] ABSTRACT

An apparatus for controlling an ignition timing for a marine engine has a temperature sensor for detecting a cold or warm-up state of the engine and for outputting an ON/OFF signal, and has an ignition timing controller for receiving the signal from the temperature sensor, for receiving signals representing an engine rotational speed and a throttle opening degree which are sent from other sensors, and for setting an optimum ignition timing. The ignition timing controller includes a spark advance control arrangement for setting the ignition timing to a state in which it is spark advanced by a predetermined angle when a cold signal from the temperature sensor is input, a first spark delay control arrangement for immediately setting the ignition timing to a spark delay state when the engine rotational speed reaches an unshiftable rotational speed after completion of the operation of said spark advance, and a second spark delay control arrangement for immediately setting the ignition timeing to the spark delay state when a warm-up signal is input from the temperature sensor.

8 Claims, 5 Drawing Sheets

METHOD AND APPARATUS FOR CONTROLLING IGNITION TIMING FOR MARINE ENGINE

FIELD OF THE INVENTION

The present invention relates to an apparatus for controlling the ignition timing for a marine engine and, more particularly, to such an apparatus which controls the ignition timing using a microcomputer.

BACKGROUND OF THE INVENTION

Hitherto, ignition control using a microcomputer (micom) in marine engines has been generally widely used. There is frequently used a method whereby, in a cold mode, the spark advance control is executed to improve the starting performance, while in a warm-up mode, spark delay control is executed to reduce the rotational speed for idling. The same applies to the case of the outboard motor.

On the other hand, in the outboard motor, the shifting operation for forward or reverse movement is executed through a jaw clutch. A structure which limits the engine start timing to the neutral mode is used from a viewpoint of safety.

The ignition timing at starting of the engine is set to a state in which spark advance is performed to a certain extent. In the spark advance state, there are advantages so that the starting performance is good and the rotational speed rises, so that the warm-up time can be reduced.

However, in the cold state, there is an inconvenience in that, even if it is intended to allow warm up during low speed operation of a ship, when the rotational speed is high the jaw clutch does not come into engagement, so that, for example, the shift cannot be set to forward.

It is an object of the invention to avoid the inconveniences of the above conventional example and, more particularly, to provide an ignition timing control apparatus for a marine engine in which the start warm-up mode of the engine is extremely easily set and, even before completion of the warm-up, the shifting operation can be executed, so that preparation of the engine for sailing can be carried out in an extremely short time.

SUMMARY OF THE INVENTION

The objects and purposes of the present invention are met by providing a temperature sensor which detects the cold state or Warm-up state of an engine and outputs an ON signal or an OFF signal; and an ignition timing controller responsive to the signal from the temperature sensor and signals representing an engine rotational speed and a throttle opening degree from other sensors for setting the optimum ignition timing. The ignition timing controller includes: a spark advance control function for setting the ignition timing to a state in which it is spark advanced by a predetermined angle when a cold signal from the temperature sensor is input; a first spark delay control function for immediately setting the ignition timing to a spark delay state when the engine rotational speed reaches an unshiftable rotational speed after completion of the operation of the spark advance control function; and a second spark delay control function for immediately setting the ignition timing to the spark delay state when a warm-up signal from the temperature sensor is input.

BRIEF DESCRIPTION OF THE DRAWINGS

A preferred embodiment of the invention is described in detail hereinafter with reference to the accompanying drawings, in which:

FIGS. 4(1), 4(2), 5(1), 5(2) and 5(3) are respective timing diagrams showing the operation of the circuit shown in FIG. 1; and FIGS. 6(1) to 6(9) are a timing diagram showing output waveforms of respective components of the circuit shown in FIG. 1.

DETAILED DESCRIPTION

The preferred embodiment shown in FIGS. 1 to 6 has a temperature sensor 52 for detecting a cold or warm-up state of an engine and outputting a signal representing the engine temperature, and has an ignition timing controller 30 for receiving not only the signal which is output from the temperature sensor 52 but also signals and the like regarding an engine rotational speed and a throttle opening degree which are sent from other sensors such as pulser coils 5 to 8 and a throttle sensor 33, and for setting an optimum ignition timing.

Figure 1:
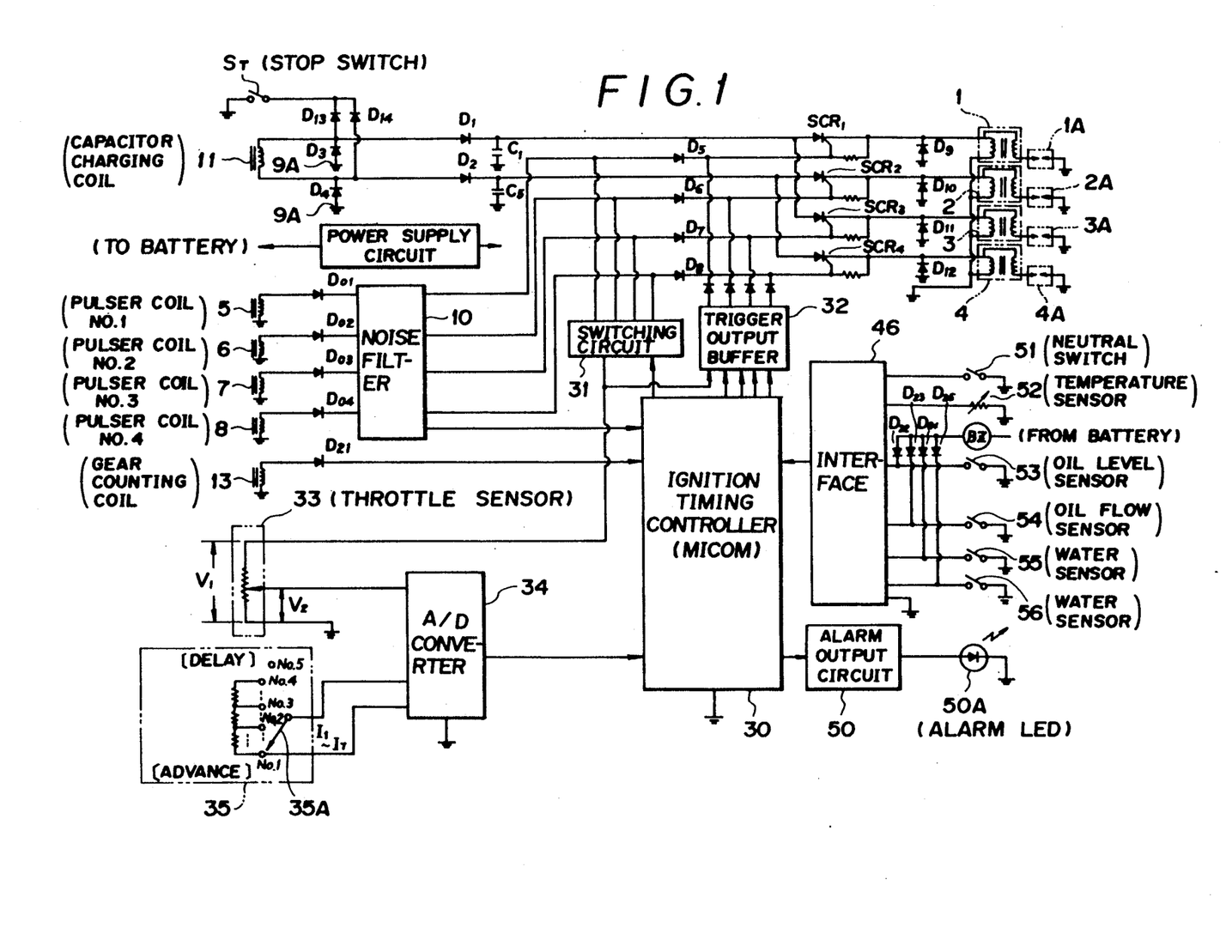
FIG. 1 is a block diagram of a circuit which is part of an apparatus embodying the present invention.

The ignition timing controller 30 is implemented in the preferred embodiment with a microcomputer, and has various control functions which include the following three functions:

1. A spark advance control function for setting the ignition timing to a state in which it is spark advanced by a predetermined angle when a cold signal from the temperature sensor is input, and for maintaining such a state.
2. A first spark delay control function for immediately setting the ignition timing to a spark delay state when an engine rotational speed reaches an unshiftable rotational speed $N_1$ after completion of the operation of the spark advance control function.
3. A second spark delay control function for immediately setting the ignition timing to a spark delay state when a warm-up signal from the temperature sensor 52 is input.

When a temperature $\theta$ (in °C.) of the engine is lower than a predetermined warm-up boundary temperature $\theta_1$ (in °C.), in order to raise the engine rotational speed after the start of the engine the ignition timing controller 30 first makes operative the spark advance control function to set the ignition timing to a spark advance state (refer to FIG. 4). Next, when an engine rotational speed N rises due to the spark advance control of the ignition timing and the jaw clutch reaches the unshiftable rotational speed $N_1$ (above which shifting is not permitted), the first spark delay control function immediately operates and the ignition timing is spark delay controlled. In this case, the spark advance state is maintained as a whole, and the first spark delay control function operates so as to maintain the engine rotational speed near the unshiftable rotational speed $N_1$ of the clutch (refer to FIG. 5).

As the engine warms up, the engine rotational speed can increase if the spark advance angle remains the same. Therefore, when the temperature is at or above the predetermined warm-up boundary temperature $\theta_1$ the ignition timing corresponding to the engine temperature $\theta$ at that time is used.

Figure 3:
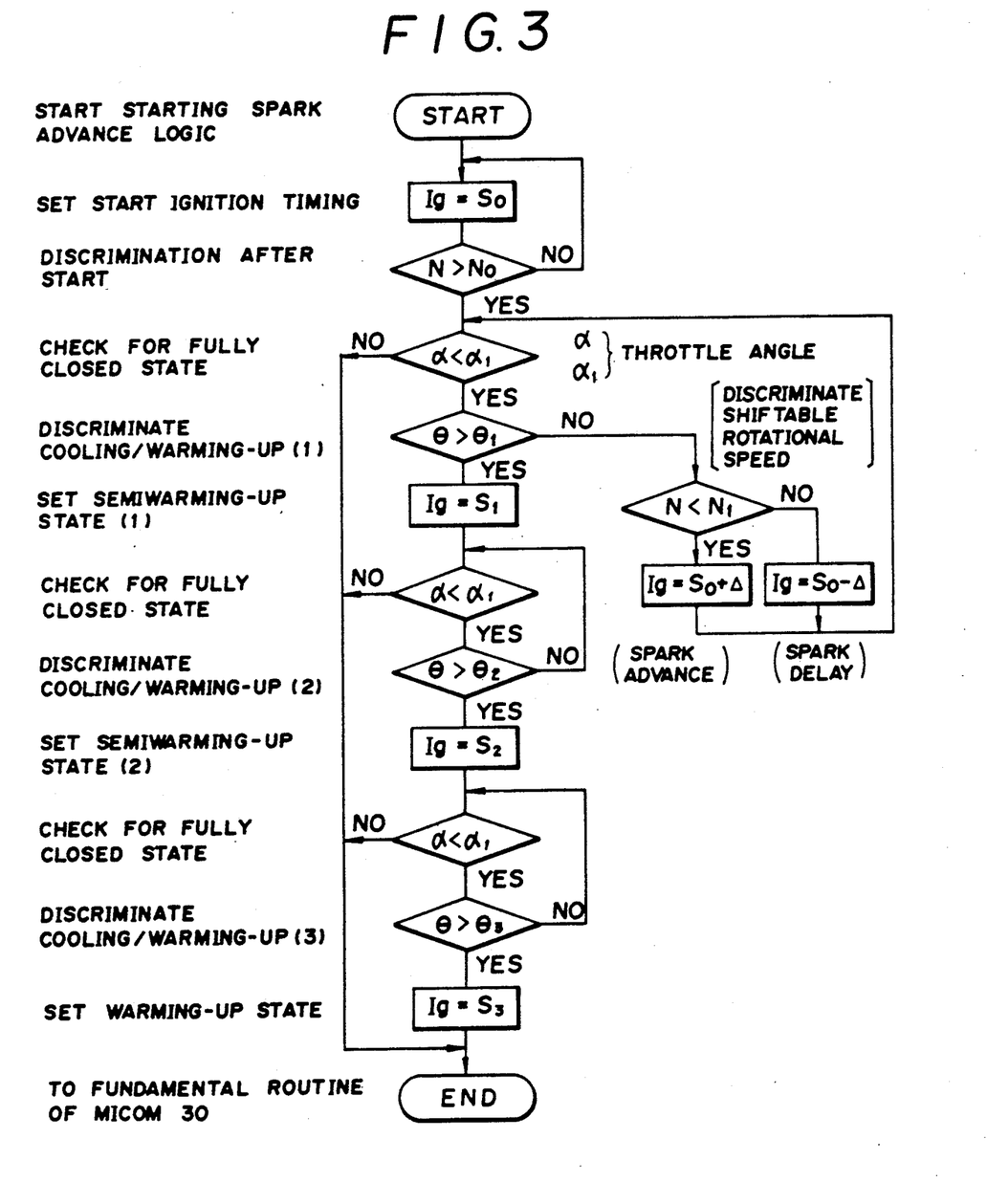
FIG. 3 is a flowchart showing part of the operation of an ignition timing controller which is a component of the circuit shown in FIG. 1.
Figure 4:
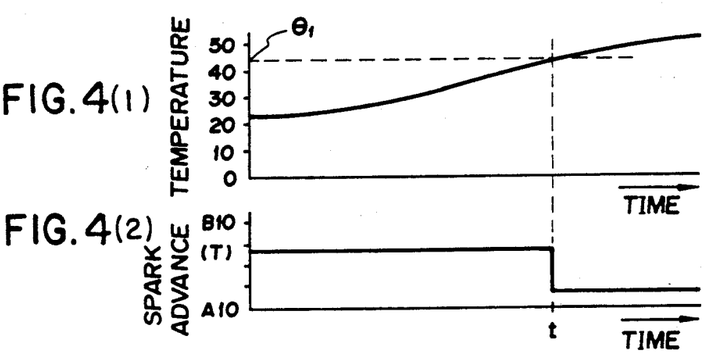
Figure 5:
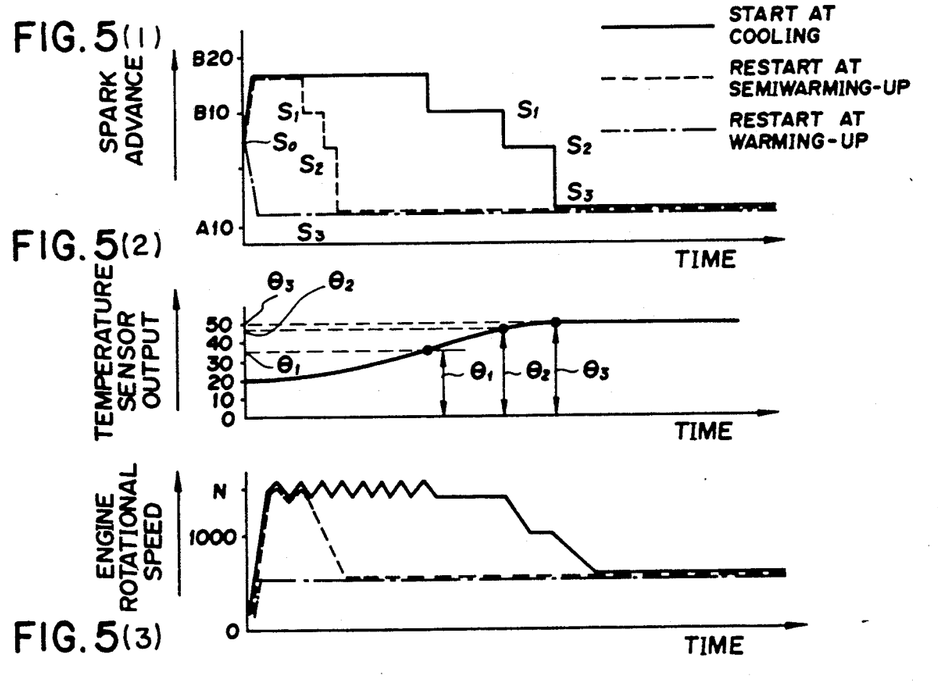
Figure 6:
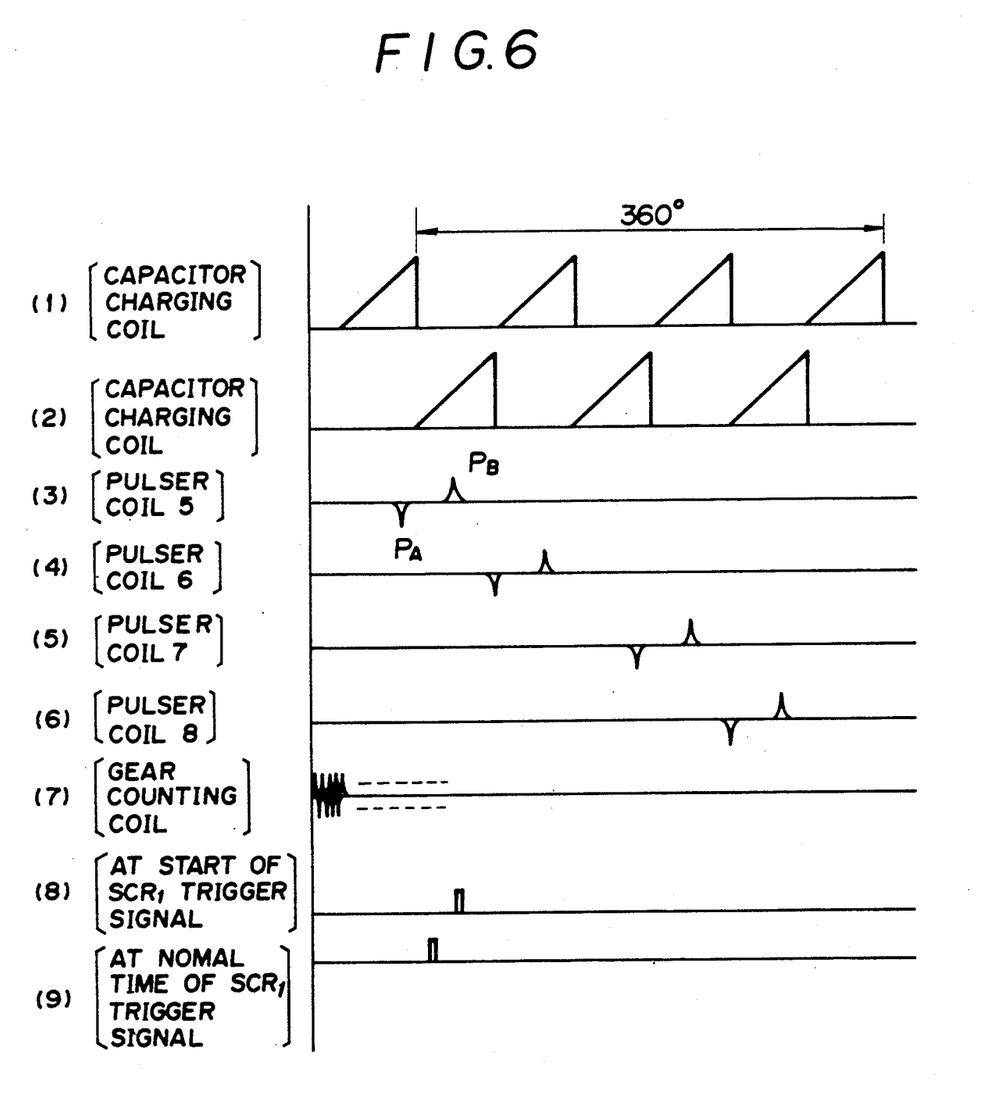

When the engine temperature becomes a completely warmed-up temperature $\theta_3$ (in ° C.) the ignition timing is set to $S_3$ as shown in FIG. 5, and ordinary ignition timing for the idling state is used. FIG. 3 shows the foregoing series of operations in the form of a flowchart.

As disclosed in the flowchart of FIG. 3, in the preferred embodiment two semiwarm-up states are set. In the case where idling and trolling at a super low speed are not necessary, in order to reduce a shift shock even in the semiwarm-up state, the spark delay control is executed to reduce the engine rotational speed N. The semiwarm-up state can be continuously changed without being set to two specific stages. Or, it is not always necessary to provide the semiwarm-up states. (If the semiwarm-up states are provided, then in the case where it is intended to warm up during sailing of the ship, a shift shock upon leaving from the seashore can be reduced. It is sufficient to carry out fishing, water skiing, or the like, which needs a super low speed after the warming-up.)

The preferred embodiment will be described in more detail hereinbelow.

Turning to a more detailed explanation, the overall construction of the inventive apparatus, including the temperature sensor 52 and ignition timing controller 30 mentioned above, will be described first.

In FIG. 1, reference numerals 1, 2, 3, and 4 denote respective ignition coils. Four pulser coils 5 to 8 are provided and respectively correspond to the ignition coils 1 to 4. On the other hand, on the primary sides of the ignition coils 1 to 4, there are provided two charging capacitors $C_1$ and $C_2$ to produce respective ignition pulse currents, and a capacitor charging coil 11 to charge the charging capacitors $C_1$ and $C_2$ to a predetermined electric potential.

Figure 2A:
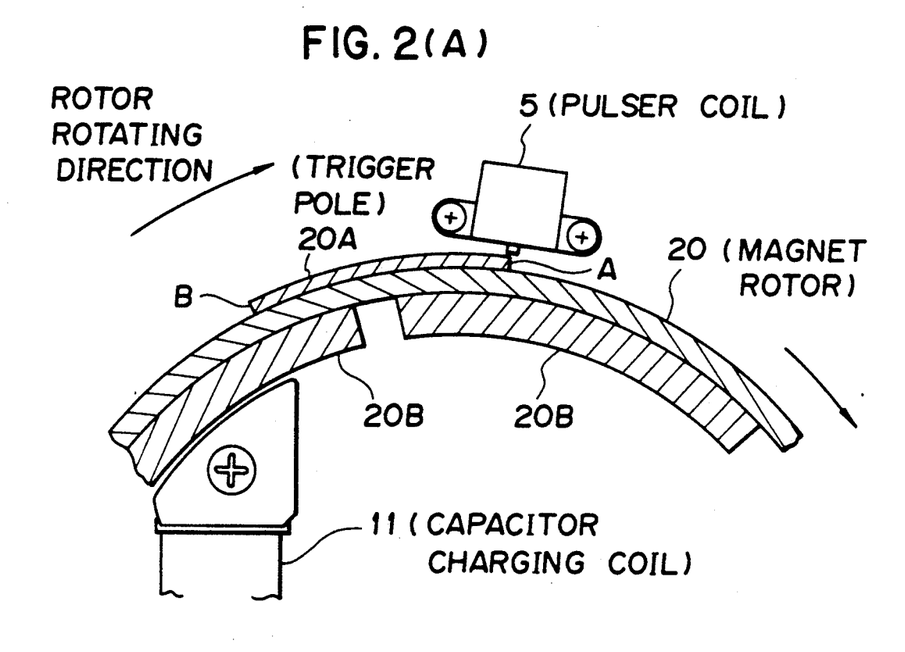
FIGS. 2A and 2B are diagrammatic views showing a rotor and various coils which are components of the circuit shown in FIG. 1.
Figure 2B:
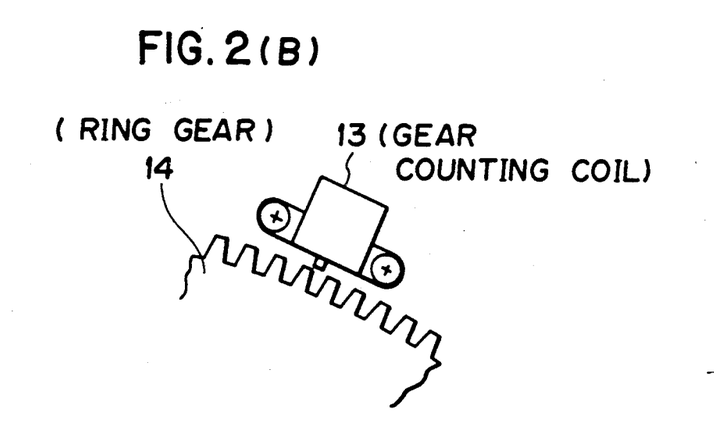

As shown for coil 5 in FIG. 2, the pulser coils 5 to 8 are arranged adjacent the outer peripheral side of a magnet rotor 20 at predetermined angular intervals so as to face the magnet rotor 20. Trigger poles 20A are attached on the outer peripheral side of the magnet rotor 20 at predetermined angular intervals. The capacitor charging coil 11 is stationarily arranged so as to face a plurality of magnets 20B attached on the inside of a cylindrical peripheral wall of the magnet rotor 20.

The charging capacitors $C_1$ and $C_2$ are respectively charged by a "+" side output and a "−" side output of the capacitor charging coil 11. As shown in FIG. 1, diodes $D_1$ and $D_4$ are serially connected with coil 11 and capacitor $C_1$ to form a charging circuit for the charging capacitor $C_1$ which has a ground portion 9B, while diodes $D_2$ and $D_3$ are serially connected with coil 11 and capacitor $C_2$ to form a charging circuit for the charging capacitor $C_2$ which has a ground portion 9A. Both ends of the capacitor charging coil 11 can be selectively connected to ground through respective diodes $D_{13}$ and $D_{14}$ by a stop switch $S_T$.

Outputs of the pulser coils 5 to 8 are applied to respective gate inputs of corresponding thyristors $SCR_1$ to $SCR_4$ through respective diodes $D_{01}$ to $D_{04}$, a noise filter 10, and respective diodes $D_5$ to $D_8$.

The ignition timing controller 30 is connected through a switching circuit section 31 to the anodes of the diodes $D_5$ to $D_8$ which are provided on the output side of the noise filter 10. A conventional microcomputer circuit 30 (hereinafter simply referred to as a "micom 30") is used in the preferred embodiment to implement the ignition timing controller 30.

A trigger output buffer 32 is connected between the cathode side of each diode $D_5$ to $D_8$ and the ignition timing controller 30. An output signal from the throttle sensor 33 is supplied as an input to each of the trigger output buffer 32 and switching circuit section 31. Diodes $D_{17}$ to $D_{20}$ respectively connect four outputs of the trigger output buffer 32 to the cathodes of diodes $D_5$ to $D_8$, respectively.

Output terminals of the thyristors $SCR_1$ to $SCR_4$ are each connected to ground through the primary side of a respective one of the ignition coils 1 to 4. Nonreturn diodes $D_9$ to $D_{12}$ connect the primary sides of the respective ignition coils 1 to 4 to ground. The anodes of the thyristors $SCR_1$ and $SCR_3$ are connected to the output terminal of the charging capacitor $C_1$. The anodes of the other thyristors $SCR_2$ and $SCR_4$ are connected to the output terminal of the charging capacitor $C_2$. The ignition timing of the above control elements and control circuits is controlled by the above ignition timing controller 30 in a manner which will be explained later.

Timing signals No. 1 to No. 5 determine the ignition timing, and are input to the ignition timing controller 30 through an A/D converter 34 from a timing signal output circuit 35 having a timing switch 35A.

On the other hand, sensor signals are input to the ignition timing controller 30 through an interface 46 from a neutral switch 51, the temperature sensor 52, an oil level sensor 53, an oil flow sensor 54, a first water sensor 55, and a second water sensor 56. When the engine operating mode has shifted from neutral mode to forward or reverse mode, the neutral switch 51 detects such a shift and outputs a detection signal indicating that neutral mode is not longer in effect.

An alarm output circuit 50 is connected to the ignition timing controller 30, and controls light emission from a light emitting device (LED) 50A for an alarm. Further, a predetermined timing signal is input from a gear counting coil 13 to the ignition timing controller 30. The gear counting coil 13 is stationarily arranged so as to face the outer peripheral surface of a ring gear 14 which is coaxial to and integral with the magnet rotor 20. The ignition timing controller 30 controls each section of the overall apparatus in a manner which will be explained later, and has as one function effecting control in the forward or reverse mode so that, when the throttle is returned from the open state to the fully closed state, the ignition timing is spark advanced from the ordinary trolling ignition timing by a few degrees.

The operation of the first embodiment will now be described.

First, when the magnet rotor 20 of FIG. 2 rotates, the magnetic flux of the magnets 20B attached to the inside of the magnet rotor 20 passes through the core of the capacitor charging coil 11 and its passing state changes, so that coil 11 generates an electromotive force. From the output on the "+" side, a current flows along a path such as "capacitor charging coil 11→diode $D_1$→capacitor $C_1$→ground 9B→diode $D_4$" and charges the capacitor $C_1$. When the rotor further rotates, an output on the "−" side is generated in the capacitor charging coil 11 and a current flows along a path such as "capacitor charging coil 11→diode $D_2$→capacitor $C_2$→ground 9A→diode $D_3$" and charges the capacitor $C_2$. The preferred embodiment is for an engine with four cylinders, the capacitor $C_1$ being provided for cylinder Nos. 1 and 3 (not shown), and the capacitor $C_2$ being provided for cylinder Nos. 2 and 4. An output waveform of the capacitor charging coil 11 is shown at (1) and (2) in FIG. 6. The ignition signal will now be described.

After the capacitor $C_1$ is charged as shown at (1) in FIG. 6, then when the core of the pulser coil 5 (coil including a magnet) faces an edge surface A of a projecting portion (trigger pole) 20A located on the outside of the rotor, an output waveform $P_A$ of the pulser coil 5 (shown at (3) in FIG. 6) is generated in the pulser coil 5. However, when the ignition timing, which is determined by the throttle opening degree and the rotational speed, is the start spark advance ignition timing or less, the micom 30 does not make the switching circuit 31 conductive, so that no influence is exerted on the gate of the thyristor $SCR_1$.

Therefore, the magnet rotor 20 further rotates. When the other end B of the trigger pole 20A faces the core of the pulser coil 5, a waveform $P_B$ shown at (3) in FIG. 5 is generated in the pulser coil 5. Since the output is directly applied to the gate of the thyristor $SCR_1$, the thyristor $SCR_1$ is turned on. The charges which have already been charged in the capacitor $C_1$ are rapidly discharged along a path such as "capacitor $C_1 \rightarrow$ thyristor $SCR_1 \rightarrow$ primary coil of ignition coil 1", so that a high voltage is generated from a secondary coil of the ignition coil 1 and is applied to a spark plug 1A. This timing is set to a start spark advance ignition timing $S_0$. Such a timing is set to improve the starting performance. In a manner similar to the above, spark plugs 2A, 3A, and 4A operate so as to be sequentially ignited.

The start spark advance ignition timing $S_0$ is used until the engine reaches a rotational speed $N_0$ which is slightly higher than a cranking rotational speed of a starter motor, or in other words is used until the starter motor has started the engine. When the engine is started, $N > N_0$. Therefore, at this time a conduction signal for the switching circuit 31 is output from the micom 30 and the switching circuit 31 is made conductive. Therefore, the pulser coil output $P_B$ shown at (3) in FIG. 3 is bypassed by the switching circuit 31. Thus, the gates of the thyristors $SCR_1$ to $SCR_4$ are not influenced by $P_B$ at all. The micom 30 receives the pulser coil output $P_A$ through the noise filter 10 and uses it as a reference signal and counts an output of the gear counting coil 13. A signal is output from the micom 30 to the gate of each of the thyristors $SCR_1$ to $SCR_4$ through the trigger output buffer 32, so that the ignition timing is determined by the output signal from the micom.

On the other hand, the temperature sensor 52 (of the thermistor type) is attached to the cylinder head of the engine or at a position near the cylinder head, and is connected to the interface 46. The interface 46 is connected to the micom 30. When the engine temperature changes, a resistance value of the temperature sensor 52 changes and a voltage which is applied to the temperature sensor 52 changes, so that the micom 30 can detect such a voltage change as engine temperature data. That is, if the engine temperature $\theta$ is at $\theta < \theta_1$ after the engine started, the micom 30 monitors the engine rotation signal from the pulser coil output. If the engine rotational speed is less than or equal to the shiftable upper limit rotational speed $N_1$ the ignition timing signal indicative of the timing which is spark advanced with respect to the start spark advance ignition timing is output to each of the thyristors $SCR_1$ to $SCR_4$. Therefore, the engine rotational speed rises. Thereafter, the micom 30 again checks the engine rotational speed. If the speed $N < N_1$ then the ignition timing is again spark advanced and such operations are repeated. On the contrary, if $N > N_1$ then the ignition timing is spark delayed. Consequently, the rotational speed is set to the almost constant speed $N_1$ as shown at (3) in FIG. 5.

When the state shown at (3) in FIG. 5 continues, and the engine becomes warmed up and the signal from the temperature sensor 52 is at or above $\theta_1$ shown at (2) in FIG. 5, the ignition timing output from the micom 30 is spark delayed from that in the case of $\theta < \theta_1$ and is set to $S_1$ shown at (1) in FIG. 5. Although the engine rotational speed also depends on the value of $S_1$, in the example at (3) in FIG. 5, the engine rotational speed can rise even at the same ignition timing as the engine warms up. However, the ignition timing is delayed to approximately a timing to maintain a rotational speed which is almost the same as that in the case where $\theta < \theta_1$ (see FIG. 5).

As the engine warms up and the engine temperature becomes $\theta > \theta_2$, the ignition timing output signal from the micom 30 is set to the spark delay signal and the ignition timing is set to $S_2$. In association with the ignition timing $S_2$, the engine rotational speed decreases from the previous state.

When the engine becomes further warmed up and the temperature becomes $\theta > \theta_3$, the micom 30 outputs the spark delay signal which is delayed from $S_2$ and the ignition timing is set to $S_3$ and the engine rotational speed also further decreases. The ignition timing $S_3$ and the engine rotational speed at this time are set to the ordinary trolling rotational speed.

While the above operations are executed, the micom checks to be certain that the throttle opening degree $\alpha$ is always $\alpha_1$ or less.

The engine rotational speed during trolling depends on the sizes of the propeller and ship, the weather conditions, and the like. In addition, since there is also a preference of a given driver, the necessary trolling ignition timing should also accordingly change. To solve such a problem in the preferred embodiment, the timing switch 35A is connected to the micom through the A/D converter 34, and a resistance value of the timing switch 35A is changed, so that the trolling ignition timing output of the micom 30 changes and the trolling rotational speed changes in association with it. Therefore, by having the driver merely manually rotate a knob of the timing switch 35A, a desired trolling rotational speed is obtained. In the embodiment, the switch can be set to five stages, in which No. 1 indicates the most spark advance and No. 5 represents the most spark delay. However, the invention is not limited to such a stepwise switch, but can also use a continuous switch such as a reostate or the like.

When the throttle sensor opening degree becomes $\alpha_1$ or more, the ignition timing is determined by the throttle opening degree and the engine rotational speed. On the other hand, if the engine has already been warmed up upon starting, the ignition timing is set as shown by a broken line or by an alternate long and short dash line at (1) in FIG. 5, depending on the warmed-up state.

By the above operations, after the engine is started, the warming-up of the engine is automatically executed and the engine rotational speed is not increased beyond the unshiftable rotational speed. Therefore, it is possible to provide the excellent function that the ship can start sailing any time. Since the embodiment has been constructed as mentioned above, there are the following advantages:

1. An idling (warm-up) lever is unnecessary to warm up after the start.
2. The starting warm-up operation is automatically executed.
3. The engine rotational speed can be raised within the shiftable rotational speed range, so that the time until the engine reaches the starting warmed-up state can be reduced.
4. The operating mode can be shifted even before completion of the warming-up operation, and the engine can be warmed up while sailing.
5. The rotational speed can soon be reduced by entering the semiwarm-up mode, so that noises, vibration, and fuel consumption can be reduced.

As mentioned above, according to the invention the starting warm-up operation can be automatically executed. The time until the engine reaches the starting warmed-up state is shorter than that in the conventional apparatus, and can be also detected in a real-time manner. On the other hand, an unshiftable state due to a significant increase in engine rotational speed can be effectively suppressed. It is possible to provide an excellent ignition timing control apparatus for marine engines which could not be obtained hitherto.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an apparatus for controlling an ignition timing for a marine engine having temperature sensor means for detecting a cold state and a warm-up state of the engine and for outputting a signal representing the engine temperature, and having ignition timing controller means for receiving said signal from said temperature sensor means, for receiving signals representing an engine rotational speed and a throttle opening degree which are sent from other sensors, and for setting an optimum ignition timing; the improvement comprising wherein said ignition timing controller means includes spark advance control means for setting the ignition timing to a state in which it is spark advanced by a predetermined angle when a cold signal from the temperature sensor is input; first spark delay control means for immediately setting the ignition timing to a spark delay state when the engine rotational speed reaches an unshiftable rotational speed after completion of the operation of said spark advance; and second spark delay control means for immediately setting the ignition timing to said spark delay state when a warm-up signal is input from said temperature sensor means.

2. A method of controlling ignition timing for a marine engine, comprising the steps of:
   monitoring the temperature and rotational speed of the engine;
   advancing the ignition timing from a first present timing when the temperature of the engine is below a first preset temperature and the rotational speed of the engine is below a first preset speed; and
   delaying the ignition timing from said first preset timing when the temperature of the engine is below said first preset temperature and the rotational speed of the engine is above said first preset speed.

3. A method as recited in claim 2, including the step of selecting as said first preset speed a maximum engine speed at which a transmission coupled to the engine can be shifted.

4. A method as recited in claim 2, including the step of setting the ignition timing to a second preset timing delayed from said first timing when the temperature of the engine is above said first preset temperature and below a second preset temperature greater than said first preset temperature.

5. A method as recited in claim 4, including the step of setting the ignition timing to a third preset timing delayed from said second preset timing when the temperature of the engine is above said second preset temperature and is below a third preset temperature greater than said second preset temperature.

6. A method as recited in claim 5, including prior to said advancing and delaying steps the step of setting the ignition timing to a starting timing while a starter motor is operatively driving said engine and until the rotational speed of the engine exceeds a value which is greater than the rotational speed at which the engine is driven by the starter motor and less than a minimum idle speed of the engine, said starting time being delayed with respect to said first preset timing.

7. A method as recited in claim 6, wherein said starting timing is approximately equal to said third preset timing.

8. A method as recited in claim 5, including the step of monitoring a throttle opening of the engine, and carrying out said advancing and delaying steps and said steps of setting the ignition timing to said second and third preset timings only when said throttle opening is smaller than a preset value.

* * * * *

UNITED STATES PATENT AND TRADEMARK OFFICE
CERTIFICATE OF CORRECTION

PATENT NO. : 5 027 771
DATED : July 2, 1991
INVENTOR(S) : Keisuki DAIKOKU et al

It is certified that error appears in the above-identified patent and that said Letters Patent is hereby corrected as shown below:

On the title page Item [73] change the Assignee's address from "Shizuoka, Japan" to ---Shizuoka-ken, Japan---.

Column 8, line 10; change "present" to ---preset---.
Column 8, line 24; change "first timing" to ---first preset timing---.
Column 8, line 41; change "time" to ---timing---.

Signed and Sealed this

First Day of December, 1992

*Attest:*

DOUGLAS B. COMER

*Attesting Officer*    *Acting Commissioner of Patents and Trademarks*